(12) United States Patent
Nanzawa et al.

(10) Patent No.: US 11,847,341 B2
(45) Date of Patent: Dec. 19, 2023

(54) MEMORY CARD, MEMORY SYSTEM, AND METHOD OF CONSOLIDATING FRAGMENTED FILES

(71) Applicant: Kioxia Corporation, Tokyo (JP)

(72) Inventors: Hidekazu Nanzawa, Sagamihara Kanagawa (JP); Tomoya Fukuzumi, Yokohama Kanagawa (JP); Yuichi Emoto, Chigasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/471,928

(22) Filed: Sep. 10, 2021

(65) Prior Publication Data
US 2022/0137862 A1 May 5, 2022

(30) Foreign Application Priority Data

Nov. 4, 2020 (JP) .................................. 2020-184498

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549;
(Continued)

(56) References Cited

U.S. PATENT DOCUMENTS 5,737,582 A * 4/1998 Fukuzumi ............. G06F 1/1656
708/131
5,761,144 A * 6/1998 Fukuzumi ............... G06F 21/79
365/228
(Continued)

FOREIGN PATENT DOCUMENTS

JP 2013-171343 A 9/2013

OTHER PUBLICATIONS

C. - h. Wu and T. -w. Kuo, "An Adaptive Two-Level Management for the Flash Translation Layer in Embedded Systems," 2006 IEEE/ACM International Conference on Computer Aided Design, San Jose, CA, USA, 2006, pp. 601-606, doi: 10.1109/ICCAD.2006.320107. (Year: 2006).*

(Continued)

*Primary Examiner* — Daniel C. Chappell
(74) *Attorney, Agent, or Firm* — Foley & Lardner LLP

(57) ABSTRACT

According to one embodiment, a memory card includes a nonvolatile memory including a data storage region and storing a table in which a logical address received from a host device is mapped to a physical address in the data storage region, and a controller configured to control the nonvolatile memory. The controller exchanges a first logical address with a second logical address based on a first command and data received from the host device.

17 Claims, 17 Drawing Sheets

(58) Field of Classification Search
CPC ...... G06F 2211/00–902; G06F 2212/00–7211;
G06F 2213/00–4004; G06F 2216/00–17;
G06F 2221/00–2153; G06K 9/00–6298;
G06N 3/00–126; G06N 5/00–048; G06N
7/00–08; G06N 10/00; G06N 20/00–20;
G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 5,845,066 | A * | 12/1998 | Fukuzumi | G06F 12/1466 726/19 |
| 6,079,019 | A * | 6/2000 | Fukuzumi | G06F 12/1466 713/193 |
| 6,363,009 | B1 * | 3/2002 | Fukuzumi | G11C 16/08 365/185.33 |
| 6,662,269 | B1 * | 12/2003 | Iida | G06F 3/0632 711/170 |
| 7,050,190 | B2 * | 5/2006 | Yamazaki | G06F 3/0643 709/219 |
| 8,321,597 | B2 * | 11/2012 | Yu | G06F 12/0246 713/1 |
| 9,164,700 | B2 * | 10/2015 | Hutton | G06F 16/13 |
| 9,280,460 | B2 * | 3/2016 | Liang | G06F 3/0604 |
| 9,720,846 | B2 * | 8/2017 | Tsirkin | G06F 13/28 |
| 10,083,120 | B2 * | 9/2018 | Kim | G06F 3/0656 |
| 10,474,369 | B2 * | 11/2019 | Tati | G06F 9/45558 |
| 10,489,064 | B2 * | 11/2019 | McClain | G06F 3/0649 |
| 11,409,444 | B2 * | 8/2022 | Kim | G06F 3/0616 |
| 11,620,233 | B1 * | 4/2023 | Habusha | G06F 12/0891 711/207 |
| 2002/0083262 | A1 * | 6/2002 | Fukuzumi | G06F 3/0679 711/217 |
| 2003/0051105 | A1 * | 3/2003 | Fukuzumi | G06F 12/0246 711/E12.083 |
| 2004/0019761 | A1 * | 1/2004 | Fukuzumi | G06F 12/0246 711/202 |
| 2011/0099326 | A1 * | 4/2011 | Jung | G06F 3/0679 711/E12.001 |
| 2012/0304039 | A1 * | 11/2012 | Peterson | H03M 13/05 711/E12.008 |
| 2013/0219244 | A1 | 8/2013 | Kato et al. | |
| 2019/0384506 | A1 * | 12/2019 | Shivanand | G06F 3/0647 |
| 2021/0294899 | A1 * | 9/2021 | Sakamoto | G06F 3/0623 |

OTHER PUBLICATIONS

C. -H. Wu, H. -H. Lin and T. -W. Kuo, "An Adaptive Flash Translation Layer for High-Performance Storage Systems," in IEEE Transactions on Computer-Aided Design of Integrated Circuits and Systems, vol. 29, No. 6, pp. 953-965, Jun. 2010, doi: 10.1109/TCAD.2010.2048362. (Year: 2010).*

Z. Cui, L. Chen, Y. Bao and M. Chen, "A swap-based cache set index scheme to leverage both superpage and page coloring optimizations," 2014 51st ACM/EDAC/IEEE Design Automation Conference (DAC), San Francisco, CA, USA, 2014, pp. 1-6, doi: 10.1145/2593069.2593078. (Year: 2014).*

* cited by examiner

| Logical address LBA | Physical address PBA |
|---|---|
| LBA(A) | PBA(A) |
| LBA(A+1) | PBA(A+1) |
| LBA(A+2) | PBA(A+2) |
| ⋮ | ⋮ |

FIG. 2

| Bit location | [47] | [46] | [45:40] | [39:8] | [7:1] | [0] |
|---|---|---|---|---|---|---|
| Width (bit) | 1 | 1 | 6 | 32 | 7 | 1 |
| Value | '0' | '1' | x | x | x | '1' |
| Description | Start bit | Transmission bit | Command index | Argument | CRC7 | End bit |
| | Command portion CM (1 byte) | | | Argument portion AG (4 bytes) | CRC portion CR (1 byte) | |
| | (6 bytes) | | | | | |

F I G. 3

Before exchange of logical addresses

| Logical address LBA | Physical address PBA |
|---|---|
| LBA(A) | PBA(A+9) |
| LBA(A+1) | PBA(A+3) |
| LBA(A+2) | PBA(A+5) |
| LBA(A+3) | PBA(A+4) |
| LBA(A+4) | PBA(A+1) |
| LBA(A+5) | PBA(A+2) |
| ⋮ | ⋮ |

After exchange of logical addresses

| Logical address LBA | Physical address PBA |
|---|---|
| LBA(A) | PBA(A+9) |
| LBA(A+1) | PBA(A+2) |
| LBA(A+2) | PBA(A+5) |
| LBA(A+3) | PBA(A+4) |
| LBA(A+4) | PBA(A+1) |
| LBA(A+5) | PBA(A+3) |
| ⋮ | ⋮ |

| Bit location | [47] | [46] | [45:40] | [39:8] | [7:1] | [0] |
|---|---|---|---|---|---|---|
| Width (bit) | 1 | 1 | 6 | 32 | 7 | 1 |
| Value | '0' | '1' | 111000(56) | [39:9]=m [8]=0 | x | '1' |
| Description | Start bit | Transmission bit | Command index | Argument | CRC7 | End bit |
| | Command portion CM (1 byte) | | | Argument portion AG (4 bytes) | CRC portion CR (1 byte) | |
| | 6 bytes | | | | | |

※ m is integer equal to or greater than 1 and equal to or smaller than 32

F I G. 10

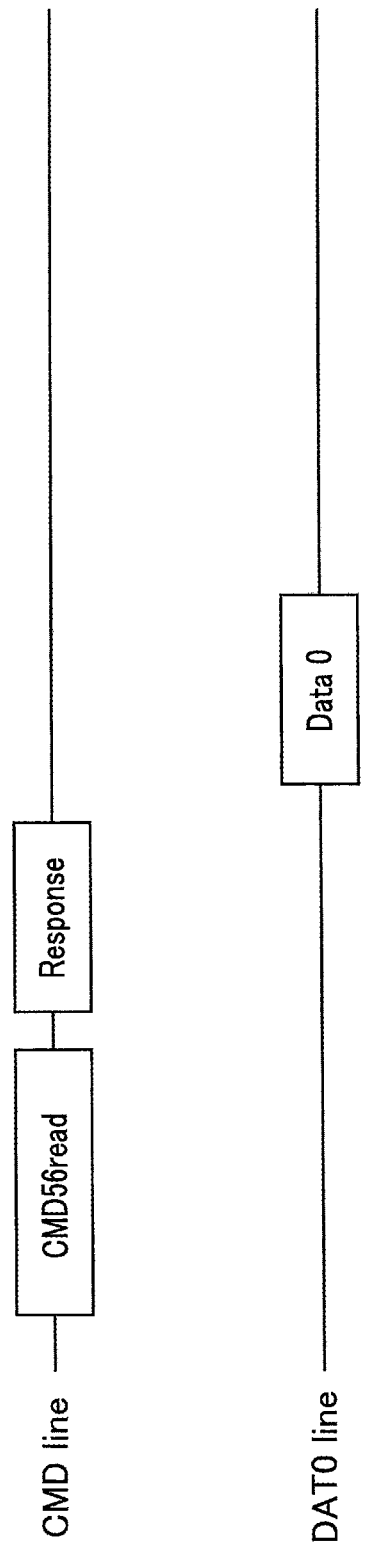
F I G. 13

| Bit location | [47] | [46] | [45:40] | [39:8] | [7:1] | [0] |
|---|---|---|---|---|---|---|
| Width (bit) | 1 | 1 | 6 | 32 | 7 | 1 |
| Value | '0' | '1' | 111000(56) | [39:9]=0 [8]=1 | x | '1' |
| Description | Start bit | Transmission bit | Command index | Argument | CRC7 | End bit |

Command portion CM (1 byte) | Argument portion AG (4 bytes) | CRC portion CR (1 byte)

6 bytes

F I G. 14

| Bit location | [47] | [46] | [45:40] | [39:8] | [7:1] | [0] |
|---|---|---|---|---|---|---|
| Width (bit) | 1 | 1 | 6 | 32 | 7 | 1 |
| Value | '0' | '1' | 111000(56) | [39:9]=m [8]=0 | x | '1' |
| Description | Start bit | Transmission bit | Command index | Argument | CRC7 | End bit |

Command portion CM (1 byte) | Argument portion AG (4 bytes) | CRC portion CR (1 byte)

6 bytes

※ m is 1, 2, 4, 8, ...

F I G. 16

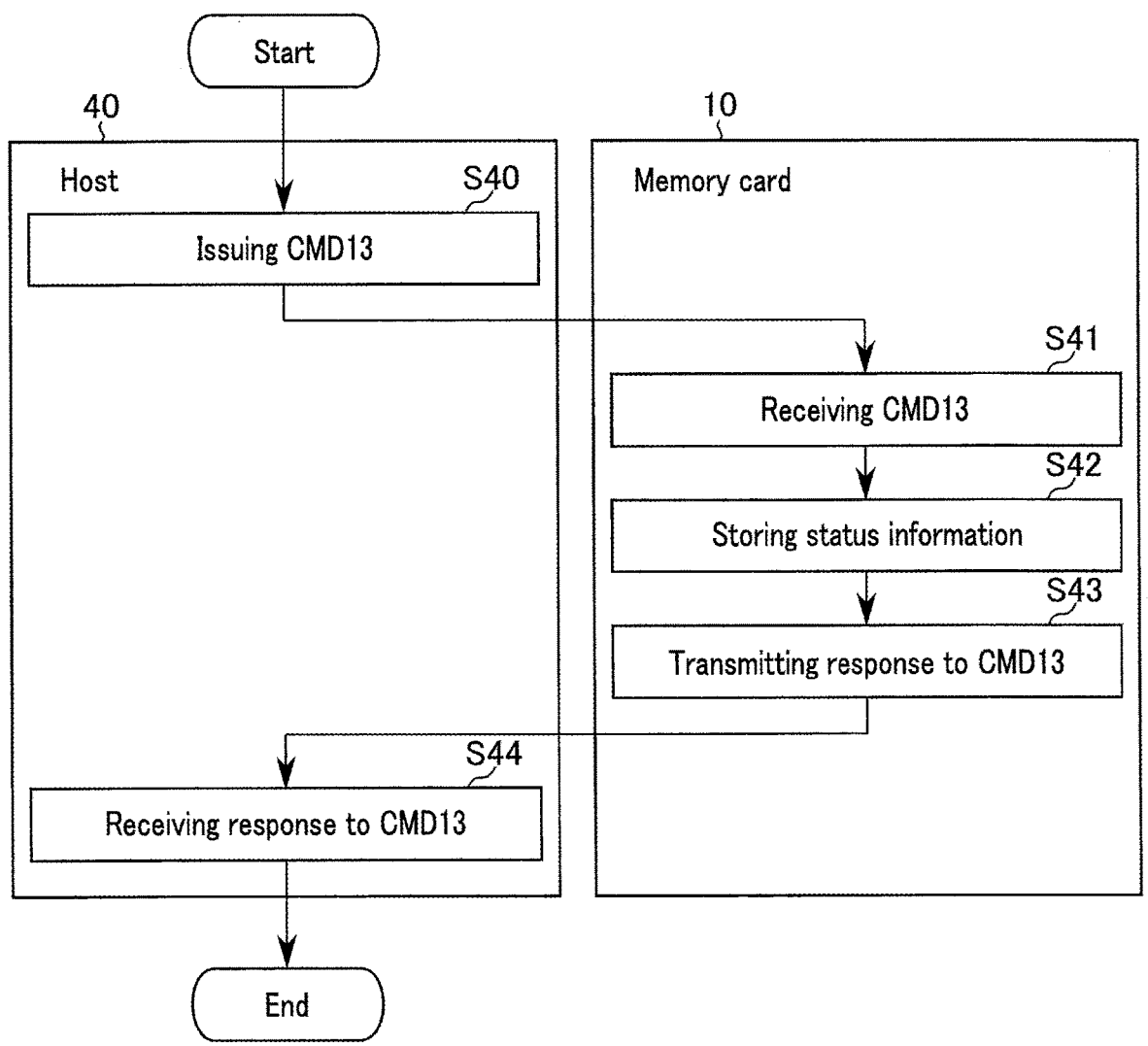
F I G. 17

MEMORY CARD, MEMORY SYSTEM, AND METHOD OF CONSOLIDATING FRAGMENTED FILES

CROSS-REFERENCE TO RELATED APPLICATIONS

This application is based upon and claims the benefit of priority from Japanese Patent Application No. 2020-184498, filed Nov. 4, 2020, the entire contents of which are incorporated herein by reference.

FIELD

Embodiments described herein relate generally to a memory card, a memory system, and a method of consolidating fragmented files.

BACKGROUND

As a memory device equipped with a nonvolatile memory, a memory card such as an SD™ card is known. The SD™ card is also used for drive recorders, which have been coming into widespread use in recent years.

BRIEF DESCRIPTION OF THE DRAWINGS

FIG. 2 is a diagram showing a logical-physical translation table included in a memory card according to the first embodiment.

FIG. 3 is a diagram showing a configuration of a host command issued by a host device in the memory system according to the first embodiment.

FIG. 10 is a diagram showing an example of a content of the host command issued by the host device in the memory system according to the first embodiment.

FIG. 13 is a diagram showing a command line and a data line during the execution result confirming operation in the consolidation of fragmented files in the memory system according to the first embodiment.

FIG. 14 is a diagram showing an example of a content of the host command issued by the host device in the memory system according to the first embodiment.

FIG. 16 is a diagram showing an example of a content of a host command issued by a host device in a memory system according to a modification of the first embodiment.

FIG. 17 is a flowchart showing an execution result confirming operation in consolidation of fragmented files in a memory system according to a second embodiment.

DETAILED DESCRIPTION

Figure 1:
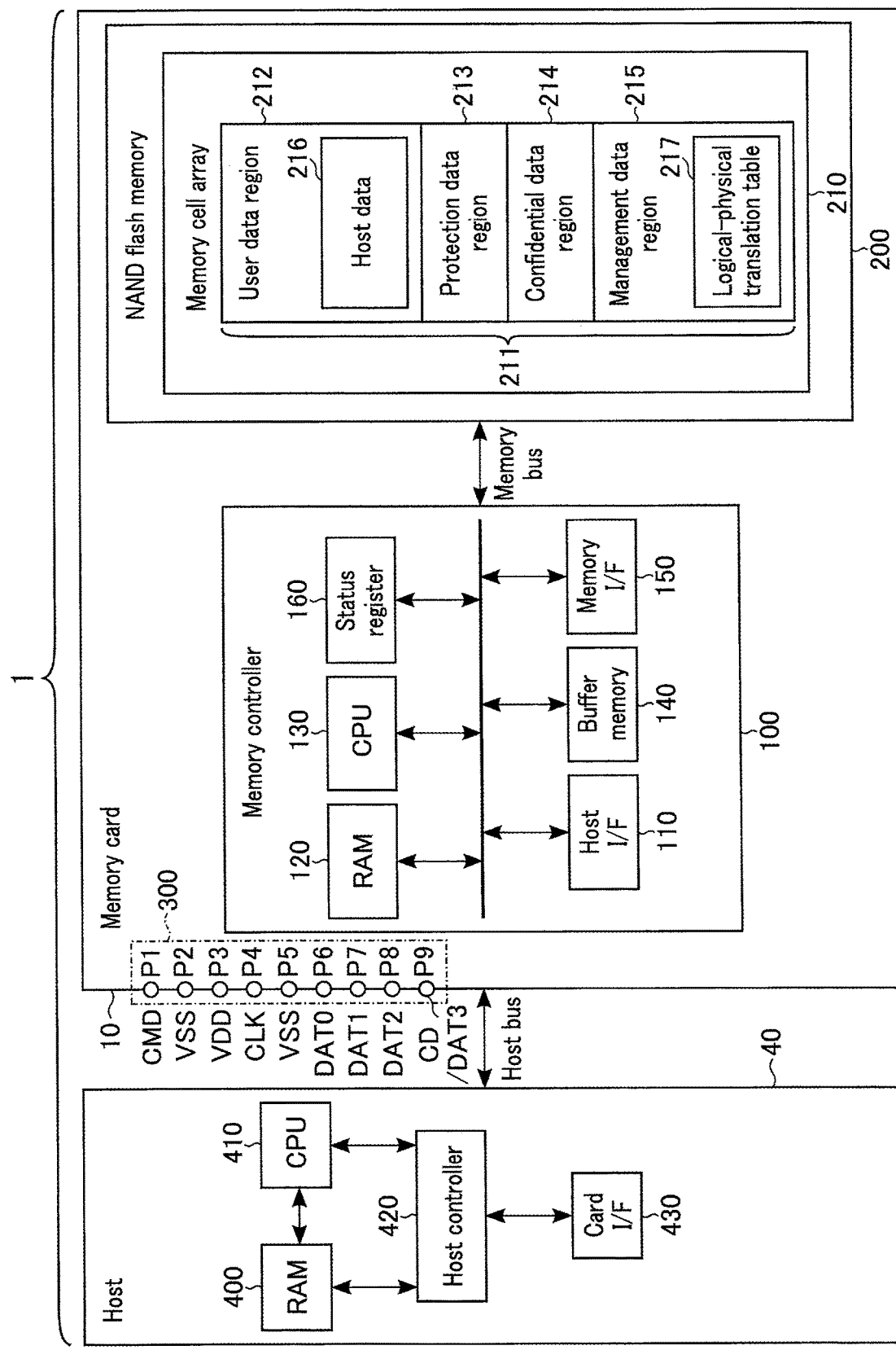
FIG. 1 is a block diagram of a memory system according to a first embodiment.

In general, according to one embodiment, a memory card includes a nonvolatile memory including a data storage region and storing a table in which a logical address received from a host device is mapped to a physical address in the data storage region, and a controller configured to control the nonvolatile memory. The controller exchanges a first logical address with a second logical address based on a first command and data received from the host device.

Hereinafter, embodiments will be described with reference to the drawings. For the description, common parts are assigned common reference numerals or symbols throughout the drawings.

1. First Embodiment

A memory system according to a first embodiment will be described. In the following, an SD™ card (hereinafter, referred to as a "memory card") will be described as an example of a memory card included in the memory system. Furthermore, a NAND flash memory will be described as an example of a nonvolatile memory included in the memory card.

1.1 Configuration

1.1.1 Overall Configuration of Memory System

First, an overall configuration of the memory system according to the present embodiment will be described with reference to FIG. 1. FIG. 1 is a block diagram of the memory system according to the present embodiment.

The memory system 1 includes a memory card 10 and a host device (hereinafter, referred to as a "host") 40. The memory card 10 and the host 40 are coupled to each other via a host bus. The memory card 10 performs processing based on a host command CMD received from the host 40. The host 40 controls the memory card 10. For example, the host 40 receives and transmits signals from and to the memory card 10. Examples of the host 40 include a drive recorder. The host bus is, for example, an SD™ interface-compatible bus.

1.1.2 Configuration of Memory Card 10

A configuration of the memory card 10 according to the present embodiment will be described with reference to FIG. 1.

The memory card 10 includes a memory controller 100, a NAND flash memory 200, and a plurality of signal pins 300 (first to ninth signal pins P1 to P9). The memory controller 100 and the NAND flash memory 200 are coupled to each other via a memory bus. The memory controller 100 controls the NAND flash memory 200. The NAND flash memory 200 stores data in a nonvolatile manner. The memory bus is, for example, a NAND interface-compatible bus.

The plurality of signal pins 300 are electrically coupled to the memory controller 100. The plurality of signal pins 300 couple the memory controller 100 to the host bus. The first signal pin P1 is used for transmission and reception of a host command CMD between the host 40 and the memory card 10. The second signal pin P2 is used for application (supply) of a ground voltage VSS from the host 40 to the memory card 10. The third signal pin P3 is used for application of a power supply voltage VDD from the host 40 to the memory card 10. The power supply voltage VDD ranges, for example, from 2.7 V to 3.6 V. The fourth signal pin P4 is used for transmission of a clock signal CLK from the host 40 to the memory card 10. The fifth signal pin P5 is used for application of the ground voltage VSS from the host 40 to the memory card 10. The sixth signal pin P6 is used for transmission and reception of data 0 (DAT0) between the host 40 and the memory card 10. The seventh signal pin P7 is used for transmission and reception of data 1 (DAT1) between the host 40 and the memory card 10. The eighth signal pin P8 is used for transmission and reception of data 2 (DAT2) between the host 40 and the memory card 10. The ninth signal pin P9 is used for card detection (CD) or transmission and reception of data 3 (DAT3) between the host 40 and the memory card 10.

Operation modes of the memory card 10 are classified roughly into an SD mode and a Serial Peripheral Interface (SPI) mode. The SD mode is an operation mode in which data is transferred in a four-bit unit or in a one-bit unit. The SPI mode is an operation mode in which data is transferred via the SPI. The use of the first signal pin P1 (hereinafter, referred to as a "CMD pin"), the sixth signal pin P6 (hereinafter, referred to as a "DAT0 pin"), the seventh signal pin P7 (hereinafter, referred to as a "DAT1 pin"), the eighth signal pin P8 (hereinafter, referred to as a "DAT2 pin"), and ninth signal pin P9 (hereinafter, referred to as a "DAT3 pin") varies depending on the operation mode.

In the SD mode, the memory card 10 is set to an SD4 bit mode or an SD1 bit mode by a bus width changing host command CMD from the host 40. In the SD4 bit mode in which data is transferred in the four-bit unit, the DAT0 pin to the DAT3 pin are used for data transmission. In the SD1 bit mode in which data is transferred in the one-bit unit, the DAT0 pin is used for data transmission. The DAT1 pin and the DAT2 pin are not used. The DAT3 pin is used for asynchronous interruption, etc. from the memory card 10 to the host 40, for example.

Hereinafter, a case in the SD1 bit mode will be described as an example.

In the SPI mode, the CMD pin is used for a data signal line (DATA IN) from the host 40 to the memory card 10. The DAT0 pin is used for a data signal line (DATA OUT) from the memory card 10 to the host 40. The DAT1 pin and the DAT2 pin are not used. The DAT3 pin is used for transmission of a chip select signal CS from the host 40 to the memory card 10.

The memory controller 100 includes a host interface circuit (host I/F) 110, a built-in memory (Random Access Memory: RAM) 120, a processor (Central Processing Unit: CPU) 130, a buffer memory 140, a memory interface circuit (memory I/F) 150, and a status register 160.

The host interface circuit 110 is coupled to the host 40 via the host bus. The host interface circuit 110 controls communications with the host 40. The host interface circuit 110 transfers, for example, the host command CMD and data received from the host 40 to the processor 130 and the buffer memory 140, respectively. The host interface circuit 110 transfers data in the buffer memory 140 to the host 40 based on an order from the processor 130.

The built-in memory 120 is used as a working area of the processor 130. The built-in memory 120 is a semiconductor memory such as a DRAM, an SRAM, etc. The built-in memory 120 stores, for example, firmware for managing the NAND flash memory 200, various management tables, etc.

The processor 130 controls the operation of the entire memory controller 100. For example, when receiving the host command CMD relating to a read operation from the host 40, the processor 130 causes, based on the received command CMD, the memory interface circuit 150 to issue a read command (memory command) for the NAND flash memory 200. The processor 130 performs a similar operation when receiving the host command CMD relating to a write operation from the host 40. Furthermore, the processor 130 executes various types of processing for managing the NAND flash memory 200 (such as a fragmented-file consolidating operation to be described later, wear leveling, etc.).

The buffer memory 140 temporarily stores data written to the NAND flash memory 200 and data read from the NAND flash memory 200.

The memory interface circuit 150 is coupled to the NAND flash memory 200 via the memory bus. The memory interface circuit 150 controls communications with the NAND flash memory 200. For example, the memory interface circuit 150 transmits various signals to the NAND flash memory 200 based on an order received from the processor 130. The memory interface circuit 150 receives various signals from the NAND flash memory 200.

The status register 160 temporarily stores status information relating to an operation of the memory card 10 (for example, a data read operation or a data write operation). The processor 130 confirms status information stored in the status register 160 and notifies the host 40 as to whether or not an operation of the memory card 10 has been completed normally.

The NAND flash memory 200 includes a memory cell array 210. The memory cell array 210 includes a region (hereinafter, referred to as a "data storage region") 211 in which data is to be written. The data storage region 211 includes a user data region 212, a protection data region 213, a confidential data region 214, and a management data region 215.

The user data region 212 is a region for storing user data therein. The user data includes host data (e.g., image data photographed by a camera (not shown) in the host 40) 216 received from the host 40 via the memory controller 100, for example. The user data region 212 is a region which a user who uses the memory card 10 can freely access. The protection data region 213 is a region for storing important data therein. The protection data region 213 is a region which becomes accessible in the case where the authentication of the host 40 is verified by the mutual authentication with the host 40 coupled to the memory card 10. The confidential data region 214 is a region for storing key information for use in encryption, confidential data for use in authentication, and security information. The management data region 215 is a region for storing card information such as a media ID and system data of the memory card 10. The system data includes, for example, a logical-physical translation table 217 to be described later.

1.1.3 Configuration of Host 40

A configuration of the host 40 included in the memory system 1 according to the present embodiment will be described with reference to FIG. 1.

The host 40 includes a built-in memory (RAM) 400, a processor (CPU) 410, a host controller 420, and a card interface circuit (card I/F) 430.

The built-in memory 400 is used as a working area of the processor 410. The built-in memory 400 is a semiconductor memory such as a DRAM, an SRAM, etc. The built-in memory 400 stores, for example, firmware for managing the host 40, etc.

In the exemplary case in which the host 40 is a drive recorder, the built-in memory 400 stores recording data obtained by recording with a camera (not shown) in the host 40. The recording data stored in the built-in memory 400 is transmitted by the card interface circuit 430 to the memory card 10 and is written in the memory card 10.

The processor 410 controls an operation of the entire host 40. For example, the processor 410 orders the host controller 420 to read data and write data in accordance with firmware.

The host controller 420 controls an operation of the card interface circuit 430. For example, the host controller 420 causes the card interface circuit 430 to issue the host command CMD for the memory card 10. The host command CMD includes, for example, a host command relating to a read operation and a host command relating to a write operation. The host command CMD will be described later in detail.

The card interface circuit 430 is coupled to the memory card 10 via the host bus. The card interface circuit 430 controls communications with the memory card 10. For example, the card interface circuit 430 transmits various signals to the memory card 10 based on an order received from the processor 410. The card interface circuit 430 receives various signals from the memory card 10.

1.1.4 Configuration of Logical-Physical Translation Table 217

The logical-physical translation table 217 will be described with reference to FIG. 2. FIG. 2 is a diagram showing the logical-physical translation table 217 included in the memory card 10 according to the present embodiment.

The logical-physical translation table 217 is a table in which a logical block address (hereinafter, simply referred to as "logical address LBA") and a physical block address (hereinafter, simply referred to as "physical address PBA") are mapped. The logical address LBA is an address managed by the host 40. The physical address PBA is a memory address within the data storage region 211 of the NAND flash memory 200. The logical-physical translation table 217 includes a plurality of entries. Each of the entries includes a logical address LBA and a physical address PBA corresponding to the logical address LBA. In the example shown in FIG. 2, a logical address LBA (A) corresponds to a physical address PBA (A). A logical address LBA(A+1) corresponds to a physical address PBA(A+1). A logical address LBA(A+2) corresponds to a physical address PBA (A+2).

As described in the above, the logical-physical translation table 217 is stored in the management data region 215 of the memory cell array 210. The logical-physical translation table 217 is loaded by the memory controller 100 into the built-in memory 120 just after power-on, for example. Hereinafter, the logical-physical translation table 217 loaded into the built-in memory 120 will be referred to as a "logical-physical translation table 217'".

The host 40 does not recognize the physical address PBA of the NAND flash memory 200. The host 40 recognizes the logical address LBA based on a memory capacity of the NAND flash memory 200. The host 40 accesses the memory controller 100 using the logical address LBA.

The memory controller 100 receives a logical address LBA from the host 40. For example, when receiving a write request from the host 40, the memory controller 100 allocates a physical address PBA corresponding to the received logical address LBA and updates the logical-physical translation table 217'. When receiving a read request from the host 40, the memory controller 100 searches the logical-physical translation table 217' loaded into the built-in memory 120 based on the received logical address LBA. The memory controller 100 accesses a physical address PBA corresponding to the logical address LBA designated by the host 40.

In the case of updating the logical-physical translation table 217' loaded into the built-in memory 120, the memory controller 100 updates the logical-physical translation table 217 within the management data region 215 based on the updated logical-physical translation table 217'.

1.1.5 Configuration of Host Command CMD

A configuration of the host command CMD issued by the host 40 will be described with reference to FIG. 3. FIG. 3 is a diagram showing a configuration of the host command CMD issued by the host 40 in the memory system 1 according to the present embodiment.

The host command CMD is constituted by six bytes (48 bits). The following description is based on the premise that a bit location of the most significant bit of the host command CMD is 47 and a bit location of the least significant bit of the host command CMD is 0. The host command CMD includes a command portion CM, an argument portion AG, and a Cyclic Redundancy Check (CRC) portion CR.

The command portion CM is constituted by one byte (eight bits). The command portion CM occupies a range from a bit location [47] to a bit location [40] (bit location [47:40]). The bit location [47] indicates a start bit. For the start bit, '0' (fixed value) is designated. The bit location [46] indicates a transmission bit. For the transmission bit, '1' (fixed value) is designated. For the bit location [45:40], a command index of the host command CMD is designated.

The argument portion AG is constituted by four bytes (32 bits). The argument portion AG occupies a range from a bit location [39] to a bit location [8] (bit location [39:8]). For the bit location [39:8], argument information of the host command CMD is designated.

The CRC portion CR is constituted by one byte (8 bits). The CRC portion CR occupies a range from a bit location [7] to a bit location [0] (bit location [7:0]). For the bit location [7:1], CRC information with respect to the command portion CM and the argument portion AG is designated. The bit location [0] indicates an end bit. For the end bit, '1' (fixed value) is designated.

1.1.6 Configuration of Data

Figure 4:
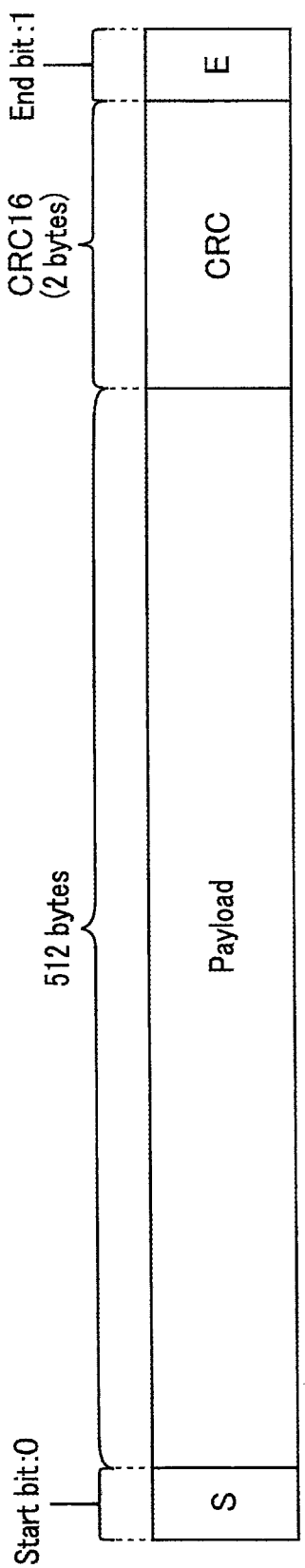
FIG. 4 is a diagram showing a configuration of data transmitted and received between the host device and the memory card in the memory system according to the first embodiment.

A configuration of data that is transmitted and received between the host 40 and the memory card 10 will be described with reference to FIG. 4. FIG. 4 is a diagram showing a configuration of data transmitted and received between the host 40 and the memory card 10 in the memory system 1 according to present embodiment. Hereinafter, a configuration of data 0 (DAT0) in the case where the DAT0 pin is used for data transmission and reception in the SD1 bit mode will be described as an example.

The data 0 (DAT0) includes a start bit, a payload, a CRC, and an end bit. The start bit is the most significant bit of data. For a start bit, '0' (fixed value) is designated. The end bit is the least significant bit of data. For the end bit, '1' (fixed value) is designated. The payload and the CRC are located between the start bit and the end bit. The payload is located between the start bit and the CRC. The payload is a body of data. The payload corresponds to 512 bytes. The CRC is located between the payload and the end bit. The CRC is CRC information with respect to the payload. The CRC corresponds to two bytes.

1.2 Operation 1.2.1 Overview of Fragmented-File Consolidating Operation

Figure 5:
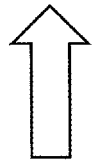
FIG. 5 is a diagram illustrating an overview of a fragmented-file consolidating operation in the memory system according to the first embodiment.

The memory system 1 according to the present embodiment performs a fragmented-file consolidating operation. Hereinafter, an overview of the fragmented-file consolidating operation in the memory system 1 according to the present embodiment will be described with reference to FIG. 5. FIG. 5 is a diagram illustrating an overview of the fragmented-file consolidating operation in the memory system 1 according to present embodiment. Hereinafter, a case in which a file system of the host 40 is a File Allocation Tables (FAT) file system will be described as an example.

FIG. 5 illustrates a state of a logical address space before consolidation of fragmented files and a state of the logical address space after consolidation of fragmented files in the host 40. The logical address space is divided into a plurality of partitions. A single square frame in FIG. 5 indicates a single partition, that is, a single cluster. In the logical address space, logical addresses LBA are sequentially allocated to clusters from the upper left to the lower right. Clusters assigned alphabetical characters are those used for writing data. Clusters assigned the same alphabetical characters form the same file. For example, three clusters assigned "A" are respectively used for writing three data pieces divided from a single file. The same applies to the other clusters assigned the other alphabetical characters. The cluster assigned "FR" is a free cluster that is not used for writing data.

In a state before consolidation of fragmented files, three clusters that form a single file are dispersed in the logical address space. Free clusters are also dispersed in the logical address space.

On the other hand, in a state after the consolidation of fragmented files, the three clusters that form the single file are continuous in the logical address space. In other words, logical addresses LBA of the three clusters that form the single file are continuous. That is, the fragmented-file consolidating operation consolidates fragmented files in the logical address space. Free clusters are also continuous in the logical address space. That is, free clusters having continuous logical addresses LBA are secured in the logical address space.

As described in the above, the fragmented-file consolidating operation is for rendering the logical address space in a state after consolidation of fragmented files. The fragmented-file consolidating operation includes a logical address exchanging operation to be described later. In the fragmented-file consolidating operation, the logical address exchanging operation is executed in the memory card 10 by the host 40 issuing the host command CMD relating to the fragmented-file consolidating operation. As a result, fragmented files are consolidated.

1.2.2 Overview of Logical Address Exchanging Operation

Figure 6:
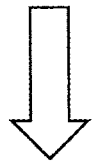
FIG. 6 is a diagram illustrating an overview of a logical address exchanging operation in the memory system according to the first embodiment.

An overview of the logical address exchanging operation performed in the fragmented-file consolidating operation described in the above will be described with reference to FIG. 6. FIG. 6 is a diagram illustrating an overview of the logical address exchanging operation in the memory system 1 according to the present embodiment. FIG. 6 illustrates a state of the logical-physical translation table 217 before exchange of logical addresses and a state of the logical-physical translation table 217 after exchange of logical addresses. FIG. 6 illustrates the exemplary case in which the logical address LBA(A+1) is exchanged with the logical address LBA(A+5) in the logical-physical translation table 217. For example, in the case where the logical address LBA(A), the logical address LBA(A+2), and the logical address LBA(A+5) are three clusters that form a single file, three logical addresses LBA with respect to the single file are made continuous by exchanging the logical address LBA (A+1) with the logical address LBA(A+5).

When the logical address LBA(A+1) is exchanged with the logical address LBA(A+5), a physical address PBA that is mapped to the logical address LBA(A+1) is changed from the physical address PBA(A+3) to the physical address PBA(A+2). Furthermore, a physical address PBA that is mapped to the logical address LBA(A+5) is changed from the physical address PBA(A+2) to the physical address PBA(A+3). As a result, the physical address PBA(A+3) is exchanged with the physical address PBA(A+2).

1.2.3 Fragmented-File Consolidating Operation

Figure 7:
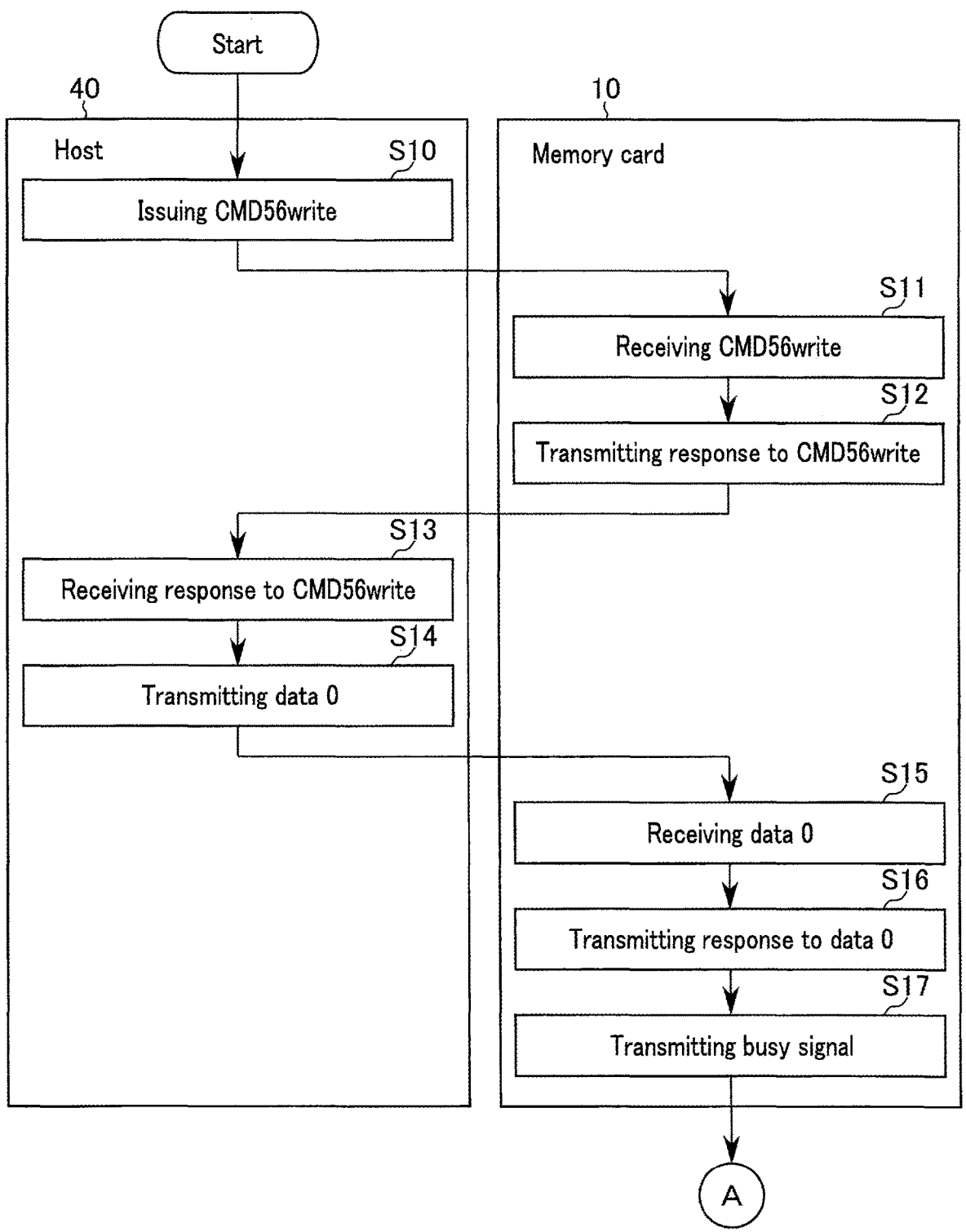
FIG. 7 is a flowchart showing the fragmented-file consolidating operation in the memory system according to the first embodiment.
Figure 8:
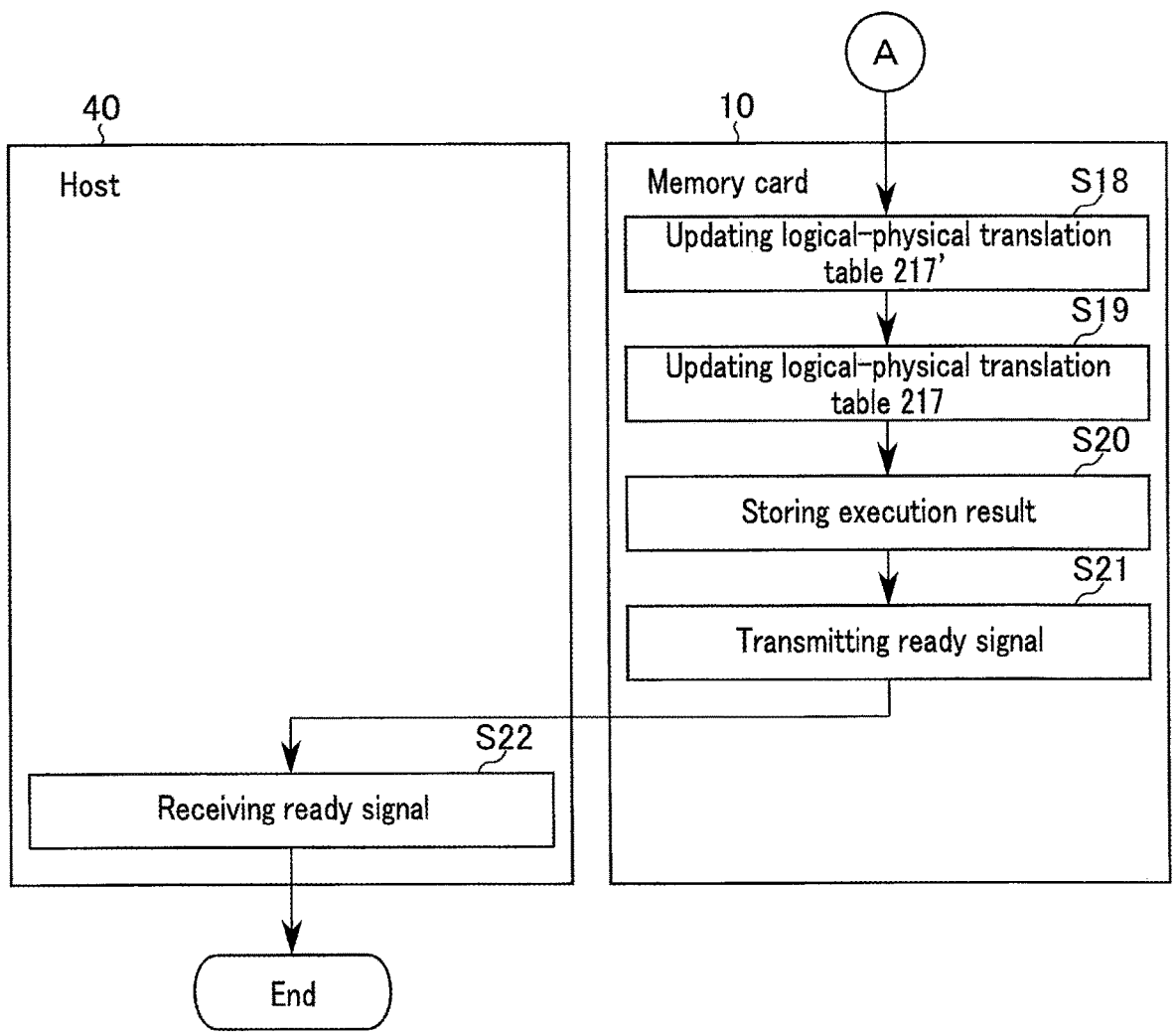
FIG. 8 is a flowchart showing the fragmented-file consolidating operation in the memory system according to the first embodiment.
Figure 9:
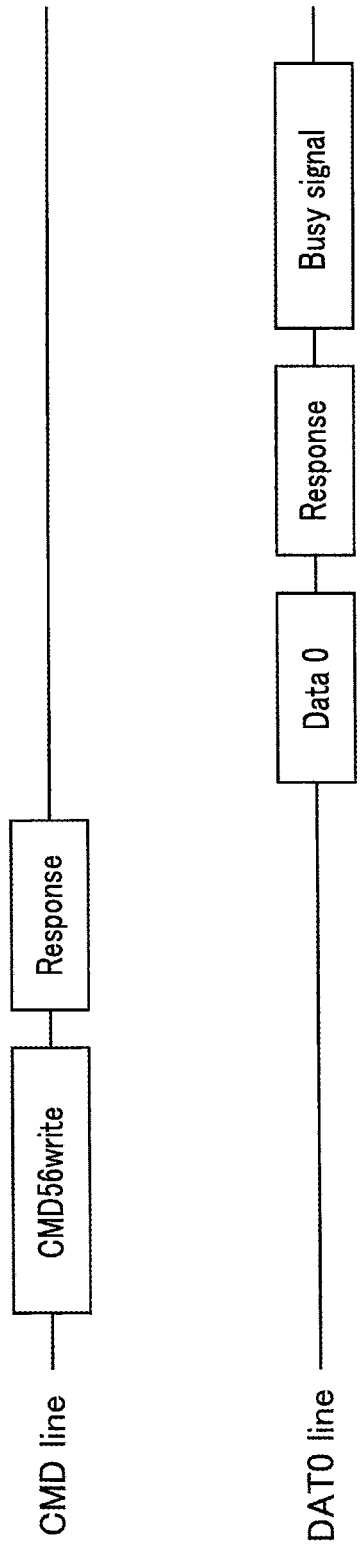
FIG. 9 is a diagram showing a command line and a data line during the fragmented-file consolidating operation in the memory system according to the first embodiment.

Next, the fragmented-file consolidating operation will be described with reference to FIGS. 7 to 9 in detail. FIGS. 7 and 8 are each a flowchart showing the fragmented-file consolidating operation in the memory system 1 according to the present embodiment. FIG. 9 is a diagram showing a command line (hereinafter, referred to as a "CMD line") and data line (hereinafter, referred to as a "DAT0 line") during the fragmented-file consolidating operation in the memory system 1 according to the present application. The "command line" is a signal line for transmitting a host command CMD issued by the host 40 and a response to the host command CMD from the memory card 10. The "data line" is a signal line for the host 40 and the memory card 10 to transmit and receive data.

The host 40 determines whether or not to consolidate fragmented files (dispersed clusters) in the logical address space. In the case where it is determined that fragmented files are to be consolidated, the host 40 performs the fragmented-file consolidating operation. The fragmented-file consolidating operation can be performed regardless of whether or not a data write operation is performed on the NAND flash memory 200. On the other hand, in the case where it is determined that consolidation of fragmented files is not necessary, the host 40 does not perform the fragmented-file consolidating operation.

In the fragmented-file consolidating operation, first, the host 40 issues for the memory card 10 a host command CMD56write via the CMD line (S10). The host command CMD56 is a vendor-specific host command defined by SD™ standards.

Herein, a content of the host command CMD56write will be described with reference to FIG. 10. FIG. 10 is a diagram showing an example of a content of the host command CMD56write issued by the host 40 in the memory system 1 according to the present embodiment.

For a command index of the command portion CM, command number 111000(56) is designated. For a bit location [8] of the argument portion AG, '0' (write) is designated. For a bit location [39:9] of the argument portion AG, a range of exchanging logical addresses LBA is designated. The "range of exchanging logical addresses LBA" is an address range of continuous logical addresses LBA. In the present embodiment, a range of exchanging logical addresses LBA is designated by an integer m that is designated for the bit location [39:9] of the argument portion AG. The integer m represents the number of sectors (the number of logical addresses LBA). The integer m is an integer equal to or greater than 1 and equal to or smaller than 32. For example, in data 0 (DAT0) to be described later, assume that a "logical address LBA(A)" is designated as a first logical address LBA (hereinafter, referred to as a "start address") in a range of logical addresses LBA in an exchange source, and a "logical address LBA(B)" is designated as a start address in a range of logical addresses LBA in an exchange destination. A method of designating a start address will be described later in detail. In this case, in the case where m=1 is designated for the bit location [39:9] of the argument portion AG, exchanging the logical address LBA(A) with the logical address LBA(B) is designated. In the case where m=32 is designated for the bit location [39:9] of the argument portion AG, exchanging the logical addresses LBA(A) to LBA(A+31) with the logical addresses LBA(B) to LBA (B+31) is designated. The same values as those in FIG. 3 are designated for the start bit and the transmission bit of the command portion CM and the end bit of the CRC portion CR.

When receiving the host command CMD56write from the host 40 (S11), the memory card 10 transmits a response to the host command CMD56write via the CMD line (S12).

When receiving the response to the host command CMD56write from the memory card 10 (S13), the host 40 transmits data 0 of the host command CMD56write via the DAT0 line (S14).

Figure 11:
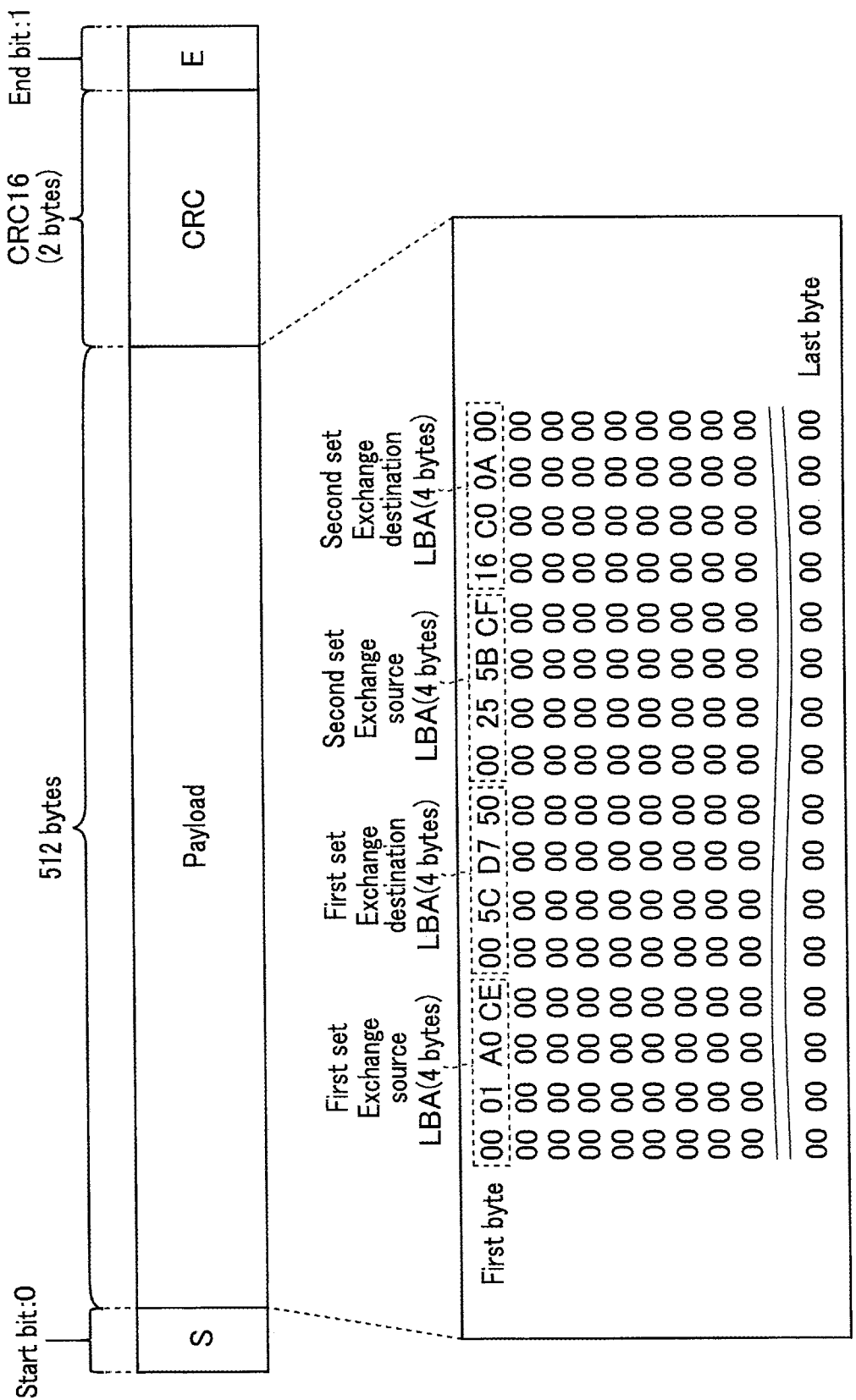
FIG. 11 is a diagram showing an example of a content of data transmitted by the host device in the memory system according to the first embodiment.

Herein, a content of the data 0 (DAT0) will be described with reference to FIG. 11. FIG. 11 is a diagram showing an example of a content of the data 0 (DAT0) transmitted by the host 40 in the memory system 10 according to the present embodiment.

A payload (512 bytes) is designated in a four-bit unit so that logical addresses LBA up to 2 [TB] can be designated. The upper left corresponds to the first four bytes. The lower right corresponds to the last four bytes. For each set of the four bytes, a start address of a range of exchanging logical addresses in an exchange source or an exchange destination is designated. For example, in the case where logical addresses LBA in an exchange source are LBA(A) to LBA(A+31), the logical address LBA(A) is designated as a start address of the exchange source.

In the fragmented-file consolidating operation, among sets of (one or more) logical addresses LBA in an exchange source and (one or more) logical addresses LBA in an exchange destination, exchange may be performed on only one set or a plurality of sets. That is, the fragmented-file consolidating operation allows the logical address exchanging operation to be performed not only once but also a plurality of times. FIG. 11 shows an exemplary case in which exchange is performed on two sets (the logical address exchanging operation is performed twice) in the fragmented-file consolidating operation. In this case, for the first four bytes, a start address (for example, the logical address LBA(A)) of the exchange source in the first set is designated. For the next four bytes, a start address (for example, the logical address LBA(B)) of the exchange destination in the first set is designated. For the next four bytes, a start address (for example, the logical address LBA(C)) of the exchange source in the second set is designated. For the next four bytes, a start address (for example, the logical address LBA(D)) of the exchange destination in the second set is designated. For a region in which no exchange information is designated, 0 is designated. The same values as those in FIG. 4 are designated for the start bit and the transmission bit.

When receiving the data 0 (DAT0) from the host 40 (S15), the memory card 10 transmits a response to the data 0 via the DAT0 line (S16). In addition, the memory card 10 transmits a signal (for example, '0') indicative of being busy in the process of the fragmented-file consolidating operation to the host 40 via the DAT0 line (S17).

Next, the memory card 10 updates the logical-physical translation table 217' within the built-in memory 120 based on argument information of the host command CMD56write received in S11, and a start address of the exchange source and a start address of the exchange destination of the data 0 (DAT0) received in S15 (S18). More specifically, for example, assume that in the data 0 (DAT0), the "logical address LBA(A)" is designated for a start address of the exchange source, and the "logical address LBA(B)" is designated for a start address of the exchange destination. In this case, in the case where m=1 is designated for the bit location [39:9] of the argument portion AG of the host command CMD56write, the processor 130 of the memory card 10 exchanges the logical address LBA(A) with the logical address LBA(B) in the logical-physical translation table 217'. In the case where m=32 is designated for the bit location [39:9] of the argument portion AG, the processor 130 of the memory card 10 exchanges the logical addresses LBA(A) to LBA(A+31) with the logical addresses LBA(B) to LBA(B+31) in the logical-physical translation table 217'.

Next, the processor 130 of the memory card 10 updates the logical-physical translation table 217 within the management data region 215 based on the logical-physical translation table 217' within the built-in memory 120 updated in S18 (S19).

Next, the memory card 10 stores an execution result in the built-in memory 120 (S20). More specifically, in the case where S18 and S19 are completed normally, the processor 130 of the memory card 10 stores a bit pattern (for example, '1') indicative of normal completion (success). On the other hand, in the case where S18 and S19 are not completed normally, the processor 130 of the memory card 10 stores a bit pattern (for example, '0') indicative of abnormal completion (failure). Furthermore, the memory card 10 transmits a signal (for example, '1') indicating that a busy state has been canceled (a state is a ready state) to the host 40 via the DAT0 line (S21).

When receiving a ready signal from the memory card 10 (S22), the host 40 recognizes that a busy state of the memory card 10 has been canceled.

1.2.4 Execution Result Confirming Operation

Figure 12:
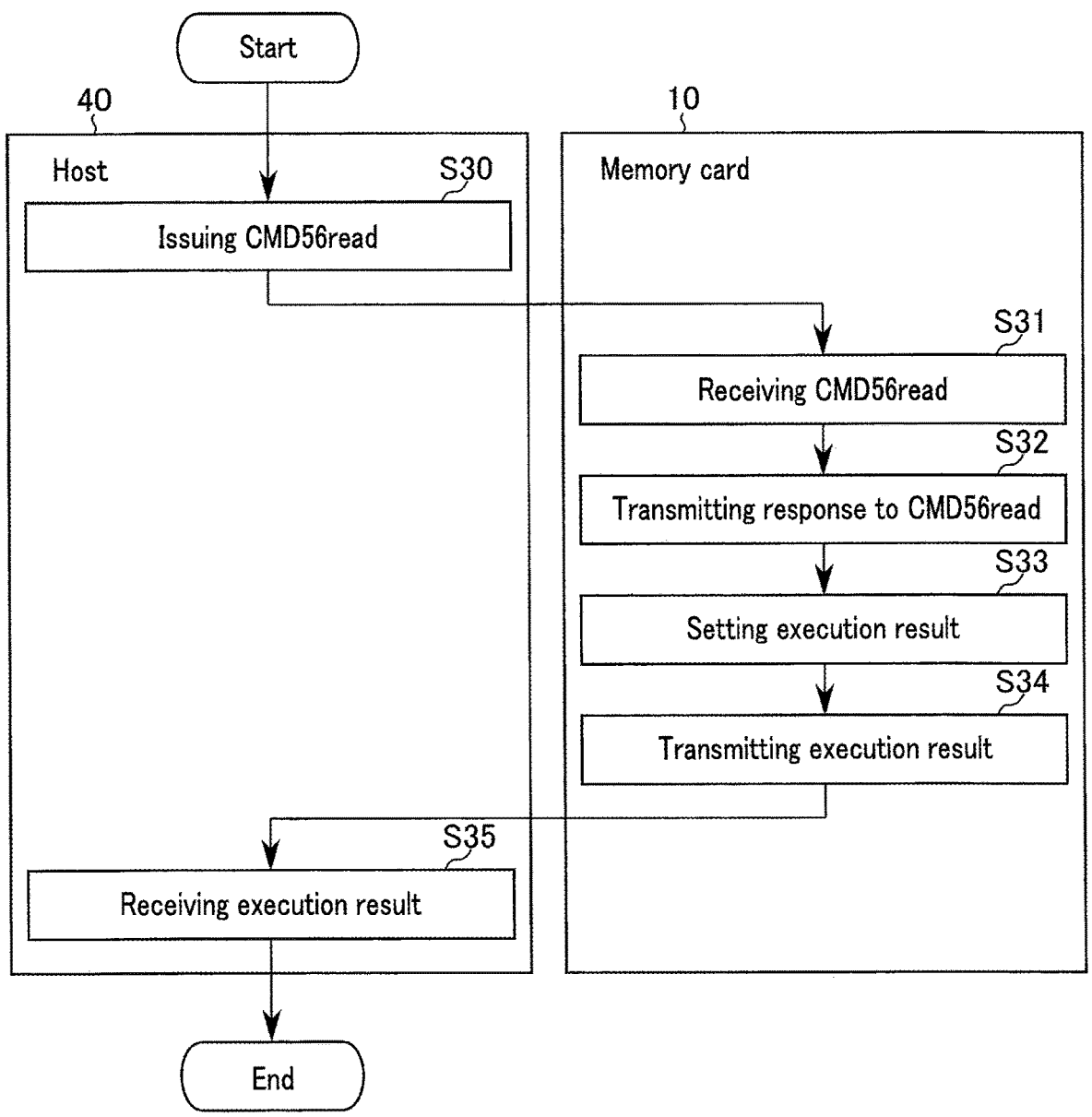
FIG. 12 is a flowchart showing an execution result confirming operation in consolidation of fragmented files in the memory system according to the first embodiment.

After completion of the fragmented-file consolidating operation described in the above, the memory system 1 according to the present embodiment confirms an execution result of the fragmented-file consolidating operation (hereinafter, simply referred to as an "execution result confirming operation"). Hereinafter, the execution result confirming operation will be described with reference to FIGS. 12 and 13. FIG. 12 is a flowchart showing the execution result confirming operation in the memory system 1 according to the present embodiment. FIG. 13 is a diagram showing the CMD line and the DAT0 line during the execution result confirming operation in the memory system 1 according to the present embodiment.

When receiving the ready signal in S22 shown in FIG. 8, the host 40 performs the execution result confirming operation.

In the execution result confirming operation, first, the host 40 issues for the memory card 10 a host command CMD56read via the CMD line (S30).

Herein, a content of the host command CMD56read will be described with reference to FIG. 14. FIG. 14 is a diagram showing an example of a content of the host command CMD56read issued by the host 40 in the memory system 1 according to the present embodiment.

For the bit location [8] of the argument portion AG, '1' (read) is designated. For the bit location [39:9] of the argument portion AG, 0 is designated. The same values as those in FIG. 10 are designated for the start bit and the transmission bit of the command portion CM and for the end bit of the CRC portion CR.

When receiving the host command CMD56read from the host 40 (S31), the memory card 10 transmits a response to the host command CMD56read via the CMD line (C32).

Next, the processor 130 of the memory card 10 sets to data 0 (DAT0) the execution result stored in the built-in memory 120 in S20 shown in FIG. 8 (S33).

Next, the memory card 10 transmits the execution result (data 0) via the DAT0 line to the host 40 (S34).

Figure 15:
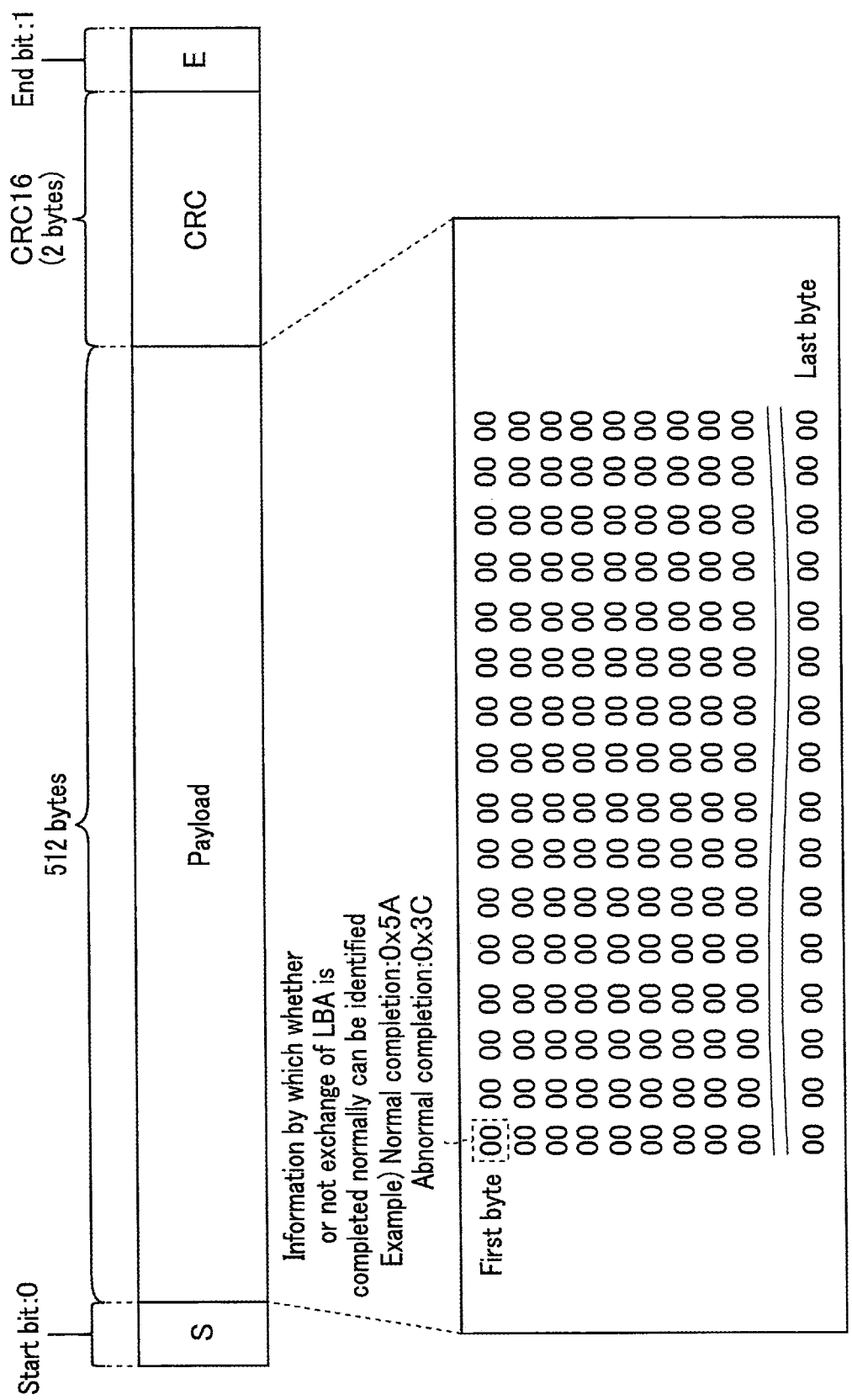
FIG. 15 is a diagram showing an example of a content of data transmitted by the memory card in the memory system according to the first embodiment.

Herein, the data 0 (DAT0) will be described with reference to FIG. 15. FIG. 15 is a diagram showing an example of a content of the data 0 (DAT0) that is transmitted by the memory card 10 in the memory system 1 according to the present embodiment.

For the first one byte, information by which whether or not the logical address exchanging operation (S18 and S19 shown in FIG. 8) has been completed normally can be identified is designated. For example, in the case where the logical address exchanging operation is completed normally, 0x5A is designated. On the other hand, in the case where the logical address exchanging operation is not completed normally, 0x3C is designated. For a region in which no information by which whether or not the logical address exchanging operation has been completed normally can be identified is designated, 0 is designated. The same values as those in FIG. 11 are designated for the start bit and the transmission bit.

When receiving the execution result (data 0 (DAT0)) from the memory card 10 (S35), the host 40 recognizes the execution result.

1.3 Effect

With the configuration according to the present embodiment, the host 40 issues for the memory card 10 the host command CMD that designates a range of exchanging logical addresses LBA. Furthermore, the host 40 issues for the memory card 10 data that designates a start address of the exchange source and a start address of the exchange destination. The memory controller 100 updates the logical-physical translation table 217 based on the host command CMD and data received from the host 40. This enables the host 40 to exchange the logical addresses LBA in the logical-physical translation table 217 without exchanging the physical address PBA with data in the memory card 10. By this, the fragmented-file consolidating operation can be executed. This suppresses the number of times the host command CMD is issued due to fragmentation of files, that is, dispersion of a plurality of logical addresses LBA that correspond to a single file.

The occurrence of fragmentation of files increases the number of times the host command CMD is issued, thereby decreasing the speed of writing recording data into the memory card 10 per unit time, which causes next recording data to overflow from the built-in memory 400 of the host 40. Thus, recording of the host 40 cannot continue and a write operation may result in failure. In this case, there is a possibility that photographing a seamless moving image will no longer be possible. According to the present embodiment, the number of times the host command CMD is issued can be suppressed. This prevents write failure (halting) due to overflow of next recording data from the built-in memory 400 of the host 40.

1.4 Modification

A modification of the first embodiment will be described. In the present modification, a case in which a method of designating a range of exchanging logical addresses LBA, designated by the host command 56write, is different from that of the first embodiment will be described. The following description will in principle concentrate on the features different from the first embodiment.

1.4.1 Content of Host Command CMD56write

A content of the host command CMD56write will be described with reference to FIG. 16. FIG. 16 is a diagram showing an example of a content of the host command CMD56write issued by the host 40 in the memory system 1 according to the present modification.

For the bit location [39:9] of the argument portion AG, a range of exchanging logical addresses LBA is designated. In the present modification, a range of exchanging logical addresses LBA is designated by the number of sectors=1, 8, 16, 32, . . . based on an integer m (m=1, 2, 4, 8, . . . ) that is designated for the bit location [39:9] of the argument portion AG. For example, in data 0 (DAT0), assume that the "logical address LBA(A)" is designated as a start address of the exchange source, and the "logical address LBA(B)" is designated as a start address of the exchange destination. In this case, in the case where 1 is designated for the bit location [39:9] of the argument portion AG, it means that the number of sectors (the number of logical addresses LBA) is equal to 1. In this case, exchanging the logical address LBA(A) with the logical address LBA(B) is designated. In the case where 2 is designated for the bit location [39:9] of the argument portion AG, means that the number of sectors is equal to 8. In this case, exchanging the logical addresses LBA(A) to LBA(A+7) with the logical addresses LBA(B) to LBA(B+7) is designated. In the case where 4 is designated for the bit location [39:9] of the argument portion AG, it means that the number of sectors is equal to 16. In this case, exchanging the logical addresses LBA(A) to LBA(A+15) with the logical addresses LBA(B) to LBA(B+15) is designated. In the case where 8 is designated for the bit location [39:9] of the argument portion AG, it means that the number of sectors is equal to 32. In this case, exchanging the logical addresses LBA(A) to LBA(A+31) with the logical addresses LBA(B) to LBA(B+31) is designated. The same applies to the case in which 16 and 32 are designated for the bit location [39:9] of the argument portion AG. The same values as those in FIG. 10 are designated for the command portion CM, the bit location [8] of the argument portion AG, and the end bit of the CRC portion CR.

1.4.2 Effect

With the configuration according to the present modification, the fragmented-file consolidating operation can be executed as with the first embodiment. Therefore, the number of times the host command CMD is issued due to fragmentation of files can be suppressed. As with the first embodiment, according to the present modification, the number of times the host command CMD is issued can be suppressed. This prevents write failure (halting) due to overflow of next recording data from the built-in memory 400 of the host 40.

2. Second Embodiment

The second embodiment will be described. In the present embodiment, an execution result confirming operation different from that of the first embodiment will be described. The following description will in principle concentrate on the features different from the first embodiment.

2.1 Execution Result Confirming Operation

The execution result confirming operation will be described with reference to FIG. 17. FIG. 17 is a flowchart showing the execution result confirming operation in the memory system 1 according to the present embodiment.

As with the first embodiment, when receiving a ready signal in S23 of the fragmented-file consolidating operation, the host 40 performs the execution result confirming operation.

In the execution result confirming operation, first, the host 40 issues for the memory card 10 a host command CMD13 via the CMD line (S40). The host command CMD13 is a host command for acquiring status information of the memory card 10 defined by SD™ standards.

When receiving the host command CMD13 from the host 40 (S41), the memory card 10 stores status information (S42). At this time, the execution result is also stored in the status register 160. More specifically, in the case where the execution result stored in the built-in memory 120 in S20 is a bit pattern (for example, '1') indicating that the fragmented-file consolidating operation has been completed normally, the processor 130 of the memory card 10 stores a bit pattern '0' indicative of success. On the other hand, in the case where the execution result is a bit pattern (for example, '0') indicating that the fragmented-file consolidating operation has not been completed normally, the processor 130 of the memory card 10 stores a bit pattern (error bit) '1' indicative of failure.

Next, the memory card 10 transmits a response to the host command CMD13 via the CMD line (S43). The response to the host command CMD13 includes status information (an execution result) stored in the status register 160 in 842.

When receiving the response to the host command CMD13 from the memory card 10 (S44), the host 40 recognizes the execution result.

2.2 Effect

With the configuration according to the present embodiment, the fragmented-file consolidating operation can be executed as with the first embodiment. Therefore, the number of times the host command CMD is issued due to fragmentation of files can be suppressed. As with the first embodiment, according to the present embodiment, the number of times the host command CMD is issued can be suppressed. This prevents write failure due to overflow of next recording data from the built-in memory 400 of the host 40. As a matter of course, the present embodiment is applicable to the modification of the first embodiment.

3. Modification, Etc.

As described in the above, a memory card according to the embodiments includes a nonvolatile memory (200) including a data storage region (211) and storing a table (217) in which a logical address (LBA) received from a host device (40) is mapped to a physical address (PBA) in the data storage region, and a controller (100) configured to control the nonvolatile memory. The controller exchanges a first logical address (LBA(A)) with a second logical address (LBA(B)) based on a first command (CMD56write) and data (data 0 of CMD56write) received from the host device.

The embodiments are not limited to those described in the above, and various modifications can be made.

The fragmented-file consolidating operation may be performed a plurality of times. In this case, the host 40 can issue the host command CMD56write to the memory card 10 a plurality of times.

Furthermore, the order of the steps in the above-described flowchart may be altered in any manner possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A memory card comprising:
a nonvolatile memory including a data storage region; and
a controller electrically connected to the nonvolatile memory and configured to:
manage a mapping table that includes a plurality of entries, in each of the plurality of entries a logical address designated by a host device being mapped to a physical address of the data storage region, the plurality of entries including at least a first entry and a second entry, a first logical address being mapped in the first entry to a first physical address, and a second logical address being mapped in the second entry to a second physical address; and
in response to receiving a first instruction from the host device, the first instruction designating the first logical address and the second logical address, update the first and second entries of the mapping table such that the first logical address is mapped to the second physical address, and the second logical address is mapped to the first physical address, without writing data to the first physical address or the second physical address, wherein the controller is configured to update the first and second entries of the mapping table by exchanging logical addresses of the first and second entries.

2. The card according to claim 1, wherein the first instruction includes information indicative of a first address range including the first logical address and a second address range including the second logical address.

3. The card according to claim 2, wherein in the information, the first address range and the second address range are designated by a number of logical addresses.

4. The card according to claim 2, wherein the first instruction includes a start address of the first address range and a start address of the second address range.

5. The card according to claim 1, wherein
the plurality of entries of the mapping table further includes a third entry and a fourth entry, a third logical address being mapped in the third entry to a third physical address, and a fourth logical address being mapped in the fourth entry to a fourth physical address, and
the controller is further configured to update the third and fourth entries of the mapping table such that the third logical address is mapped to the fourth physical address, and the fourth logical address is mapped to the third physical address, based on the first instruction after updating the first and second entries of the mapping table.

6. The card according to claim 4, wherein
the plurality of entries of the mapping table further includes a third entry and a fourth entry, a third logical address being mapped in the third entry to a third physical address, and a fourth logical address being mapped in the fourth entry to a fourth physical address,
the controller is further configured to update the third and fourth entries of the mapping table such that the third logical address is mapped to the fourth physical address and the fourth logical address is mapped to the third physical address, based on the first instruction after updating the first and second entries of the mapping table, and
the first instruction further includes a start address of a third address range including the third logical address and a start address of a fourth address range including the fourth logical address.

7. The card according to claim 1, wherein the controller is further configured to transmit to the host device a result of updating the first and second entries of the mapping table, based on a second instruction received from the host device.

8. The card according to claim 1, wherein the controller is further configured to transmit to the host device status information including a result of updating the first and second entries of the mapping table, based on a third instruction received from the host device.

9. A memory system comprising:
a memory card including a nonvolatile memory and a controller, the nonvolatile memory including a data storage region, the controller being electrically connected to the nonvolatile memory; and
a host device configured to control the memory card,
wherein the controller is configured to:
manage a mapping table that includes a plurality of entries, in each of the plurality of entries a logical address designated by the host device being mapped to a physical address of the data storage region, the plurality of entries including at least a first entry and a second entry, a first logical address being mapped in the first entry to a first physical address, and a second logical address being mapped in the second entry to a second physical address; and
in response to receiving a first instruction from the host device, the first instruction designating the first logical address and the second logical address,
update the first and second entries of the mapping table such that the first logical address is mapped to the second physical address and the second logical address is mapped to the first physical address, without writing data to the first physical address or the second physical address, wherein the controller is configured to update the first and second entries of the mapping table by exchanging logical addresses of the first and second entries.

10. The system according to claim 9, wherein the first instruction includes information indicative of a first address range including the first logical address and a second address range including the second logical address.

11. The system according to claim 10, wherein in the information, the first address range and the second address range are designated by a number of logical addresses.

12. The system according to claim 10, wherein the first instruction includes a start address of the first address range and a start address of the second address range.

13. A method of controlling a nonvolatile memory, the nonvolatile memory including a data storage region, the method comprising:
managing a mapping table that includes a plurality of entries, in each of the plurality of entries a logical address designated by a host device being mapped to a physical address of the data storage region, the plurality of entries including at least a first entry and a second entry, a first logical address being mapped in the first entry to a first physical address, and a second logical address being mapped in the second entry to a second physical address; and
in response to receiving, a first instruction from the host device, the first instruction designating the first logical address and the second logical address,
updating the first and second entries of the mapping table such that the first logical address is mapped to the second physical address and the second logical address is mapped to the first physical address, without writing data to the first physical address or the second physical address, wherein the first and second entries of the mapping table are updated by exchanging logical addresses of the first and second entries.

14. The method according to claim 13, wherein the first instruction includes information indicative of a first address range including the first logical address and a second address range including the second logical address.

15. The method according to claim 14, wherein in the information, the first address range and the second address range are designated by a number of logical addresses.

16. The method according to claim 14, wherein the first instruction includes a start address of the first address range and a start address of the second address range.

17. The system according to claim 9, wherein
the memory card connects to the host device with a command line and a data line, and
the controller receives the first instruction via the command line and the data line.

* * * * *